(12) United States Patent
Demura et al.

(10) Patent No.: US 8,943,195 B2
(45) Date of Patent: Jan. 27, 2015

(54) NODE DETECTION APPARATUS, NODE DETECTION METHOD AND COMPUTER READABLE MEDIUM

(75) Inventors: Tetsuya Demura, Ishikawa (JP); Toshitaka Kawahigashi, Ishikawa (JP); Naoki Saitou, Ishikawa (JP); Masaki Matsuda, Ishikawa (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 159 days.

(21) Appl. No.: 13/554,774

(22) Filed: Jul. 20, 2012

(65) Prior Publication Data

US 2013/0031248 A1 Jan. 31, 2013

(30) Foreign Application Priority Data

Jul. 26, 2011 (JP) .................................. 2011-162744

(51) Int. Cl.
*G06F 15/173* (2006.01)
*H04L 29/12* (2006.01)
(Continued)

(52) U.S. Cl.
CPC .......... *H04L 61/103* (2013.01); *H04L 43/0805* (2013.01); *H04L 43/08* (2013.01); *H04L 43/0811* (2013.01); *H04L 43/0817* (2013.01); *H04L 43/12* (2013.01); *H04L 43/10* (2013.01); *H04L 61/15* (2013.01); *H04L 61/25* (2013.01); *H04L 29/08099* (2013.01); *H04L 29/12301* (2013.01); *H04L 61/1511* (2013.01)
USPC .......................................... 709/224; 709/223

(58) Field of Classification Search
CPC ..... H04L 61/25; H04L 61/15; H04L 61/1511; H04L 43/08; H04L 43/10; H04L 43/12; H04L 43/0805; H04L 43/0811; H04L 43/0817; H04L 29/12301; H04L 29/08099
USPC .......... 709/228, 222, 223, 224; 370/254, 352, 370/390, 401, 208, 392; 726/1
See application file for complete search history.

(56) References Cited

U.S. PATENT DOCUMENTS

2004/0052257 A1* 3/2004 Abdo et al. .................. 370/401
2004/0143579 A1 7/2004 Nakazawa
(Continued)

FOREIGN PATENT DOCUMENTS

JP 2002-525944 A 8/2002
JP 2004228760 A 8/2004
(Continued)

OTHER PUBLICATIONS

Japanese Office Action, corresponding to Japanese Application No. 2011-162744, mailed May 20, 2014.
(Continued)

*Primary Examiner* — Le H Luu
(74) *Attorney, Agent, or Firm* — Hogan Lovells US LLP (57) ABSTRACT

There is provided a node detection apparatus including: an acquisition section that acquires address information of communication equipment managed by a DNS server; an operation confirmation section that confirms operations of the communication equipment based on the address information acquired by the acquisition section; and a node registration section that registers the communication equipment having the address information acquired by the acquisition section as an operating node, based on a result of the operation confirmation by the operation confirmation section.

10 Claims, 10 Drawing Sheets

(51) Int. Cl.
*H04L 12/26* (2006.01)
*H04L 29/08* (2006.01)

(56) References Cited

U.S. PATENT DOCUMENTS

| | | | |
|---|---|---|---|
| 2005/0157730 A1* | 7/2005 | Grant et al. | 370/401 |
| 2006/0136987 A1* | 6/2006 | Okuda | 726/1 |
| 2008/0008183 A1* | 1/2008 | Takagaki et al. | 370/392 |
| 2008/0043614 A1* | 2/2008 | Soliman | 370/208 |
| 2008/0056286 A1* | 3/2008 | Forssell et al. | 370/401 |
| 2008/0089330 A1* | 4/2008 | Ballantyne | 370/390 |
| 2009/0041004 A1* | 2/2009 | Emmanuel | 370/352 |
| 2009/0116404 A1* | 5/2009 | Mahop et al. | 370/254 |
| 2012/0036241 A1* | 2/2012 | Jennings et al. | 709/222 |
| 2012/0131211 A1* | 5/2012 | Schemitsch | 709/228 |

FOREIGN PATENT DOCUMENTS

| | | |
|---|---|---|
| JP | 2009124566 A | 6/2009 |
| WO | WO 00/17769 A1 | 3/2000 |

OTHER PUBLICATIONS

Hideo Takahashi, et al., "An Automatic Audit System for Detecting the Network Vulnerability," ITE Technical Report 27(51), pp. 53-56, Sep. 25, 2003, Japan, The Institute of Image Information and Television Engineers.

* cited by examiner

(A)Results of acquiring DNS record (IPv6)

| [server.example.co.jp] | | |
|---|---|---|
| nodea | AAAA | 2001:DB8::201 |
| nodeb | AAAA | 2001:DB8::205 |
| server | AAAA | 2001:DB8::208 |

(IPv4)

| [server.example.co.jp] | | |
|---|---|---|
| nodea | A | 192.0.2.2 |
| nodeb | A | 192.0.2.3 |
| server | A | 192.0.2.4 |

Fig. 4(B)

(B)Neighbor cache information

| Interface 1: Local area connected | | |
|---|---|---|
| Internet Address | Physical Address | Type |
| fe80::218:d1ff:fe03:d494 | 00-18-d1-03-d4-94 | Permanent |
| ff02::1 | 33-32-00-00-00-02 | Permanent |
| 2001:DB8::201 | 00-18-d1-03-d4-94 | Permanent |
| fe80::212:11ff:fe2f:fc96 | 00-12-11-2f-fc-96 | Stale |
| fe80::2b1:d0ff:fe34:b3f2 | 00-b1-d0-34-b3-f2 | Stale |
| fe80::216:5dff:fe41:5026 | 00-16-5d-41-50-26 | Stale |

Fig. 4(C)

(C) ARP information

```
Interface: 192.0.2.9 --- 0x4
    Internet Address    Physical Address      Type 192.0.2.1           00-0c-5d-18-87-16     dynamic 192.0.2.20          00-1a-99-28-2e-1d     dynamic 192.0.2.162         00-81-17-81-02-46     dynamic 192.0.2.249         00-31-05-3f-e3-14     dynamic
```

Fig. 5

Node detection sequence (S20)

Fig. 6(A)

(A)Outline

① Makes inquiry to neighbor cache by executing netsh command
② Compare analysis of operation results and IP address in detected database
③ Registers in database

Fig. 6(B)

(B)Example of executing netsh command

| Interface 1: Local area connected | | |
|---|---|---|
| Internet Address | Physical Address | Type |
| fe80::218:d1ff:fe03:d494 | 00-18-d1-03-d4-94 | Permanent |
| ff02::1 | 33-32-00-00-00-02 | Permanent |
| 2001:DB8::201 | 00-18-d1-03-d4-94 | Permanent |
| fe80::212:11ff:fe2f:fc96 | 00-12-11-2f-fc-96 | Stale |
| fe80::2b1:d0ff:fe34:b3f2 | 00-b1-d0-34-b3-f2 | Stale |
| fe80::216:5dff:fe41:5026 | 00-16-5d-41-50-26 | Stale |

Fig. 6(C)

(C) Detected database record

| nodea | 2001:DB8::201 | 00-18-d1-03-d4-94 |
|---|---|---|
| nodeb | 2001:DB8::205 | |
| server | 2001:DB8::208 | |

NODE DETECTION APPARATUS, NODE DETECTION METHOD AND COMPUTER READABLE MEDIUM

CROSS-REFERENCE TO RELATED APPLICATIONS

This application is based on and claims priority under 35 USC 119 from Japanese Patent Application No. 2011-162744 filed Jul. 26, 2011.

FIELD

The present invention relates to a node detection apparatus, a node detection method and computer readable medium.

BACKGROUND

JP2002-525944 disclosed a method of resolving a fiber channel device address in a network from a completely certified domain of a device, the method including the steps of: transmitting a domain name inquiry containing the completely certified domain name to a domain name server via the network from a host computer in order to determine an internet protocol address corresponding to the device; positioning the internet protocol address corresponding to the device based on the completely certified domain name in the domain name server; transmitting the device's internet protocol address to the host computer; transmitting an address resolution protocol request containing the internet protocol address via the storage region network from the host computer in order to determine a node name of the device; transmitting an address resolution protocol response containing the device node name to the host computer; transmitting a fiber channel address resolution protocol request containing the device node name from the host computer to the device in order to determine a physical address of the device; and transmitting a fiber channel address resolution protocol response containing the physical address of the device to the host computer.

SUMMARY OF THE INVENTION

According to an aspect of the invention, there is provided a node detection apparatus including: an acquisition section that acquires address information of communication equipment managed by a DNS server; an operation confirmation section that confirms operations of the communication equipment based on the address information acquired by the acquisition section; and a node registration section that registers the communication equipment having the address information acquired by the acquisition section as an operating node, based on a result of the operation confirmation by the operation confirmation section.

According to another aspect of the invention, there is provided a node detection method including the steps of: acquiring address information of communication equipment managed by a DNS server; confirming operations of the communication equipment based on the acquired address information; and registering the communication equipment having the acquired address information as an operating node, based on a result of the operation confirmation.

According to another aspect of the invention, there is provided a non-transitory computer-readable medium storing thereon a computer program that causes a computer to perform the steps of: acquiring address information of communication equipment managed by a DNS server; confirming operations of the communication equipment based on the acquired address information; and registering the communication equipment having the acquired address information as an operating node, based on a result of the operation confirmation.

BRIEF DESCRIPTION OF DRAWINGS

Exemplary embodiments of the present invention will be described in detail based on the following figures, wherein.

DESCRIPTION OF THE PREFERRED EMBODIMENTS

The following will describe an exemplary embodiment of the present invention with reference to the drawings.

Figure 1:
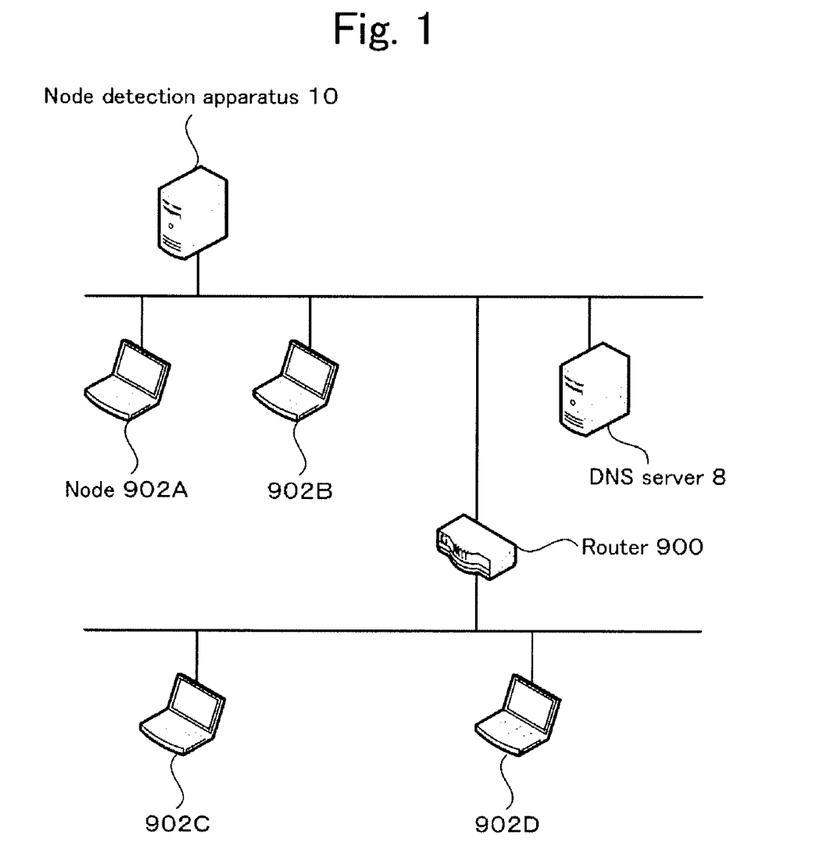
FIG. 1 is an explanatory diagram of an outline of a node detection system 1.

FIG. 1 is an explanatory diagram of the outline of a node detection system 1.

As exemplified in FIG. 1, the node detection system 1 of the present embodiment has a node detection apparatus 10 and a DNS server 8. Nodes 902A to 902D are targets to be detected and scattered over a plurality of segments connected via a router 900.

The node detection apparatus 10 is, for example, a server apparatus in which the later-described node detection program 5 is installed and detects nodes present in a network. In the present specification, the node refers to an element of the network and includes communication equipment such as a computer terminal, a router, and a hub. Although a notebook computer terminal 902 is described as a node in the present example, the present invention is not limited to it; for example, the router 900 etc. could be a node.

The DNS server 8 is a server apparatus of a domain name system and manages a table which shows correspondence between internet protocol (IP) addresses and domain names or host names. The DNS server 8 of the present example stores at least AAAA records containing IPv6 IP address and an A record containing IPv4 IP address and manages IP addresses and host names of the node 902.

Although the following description is based on the assumption that IPv6 nodes and IPv4 nodes are mixed in the network, the present invention is not limited to it; the present invention holds true also with a network composed of only the IPv6 nodes or the IPv4 nodes.

Figure 2:
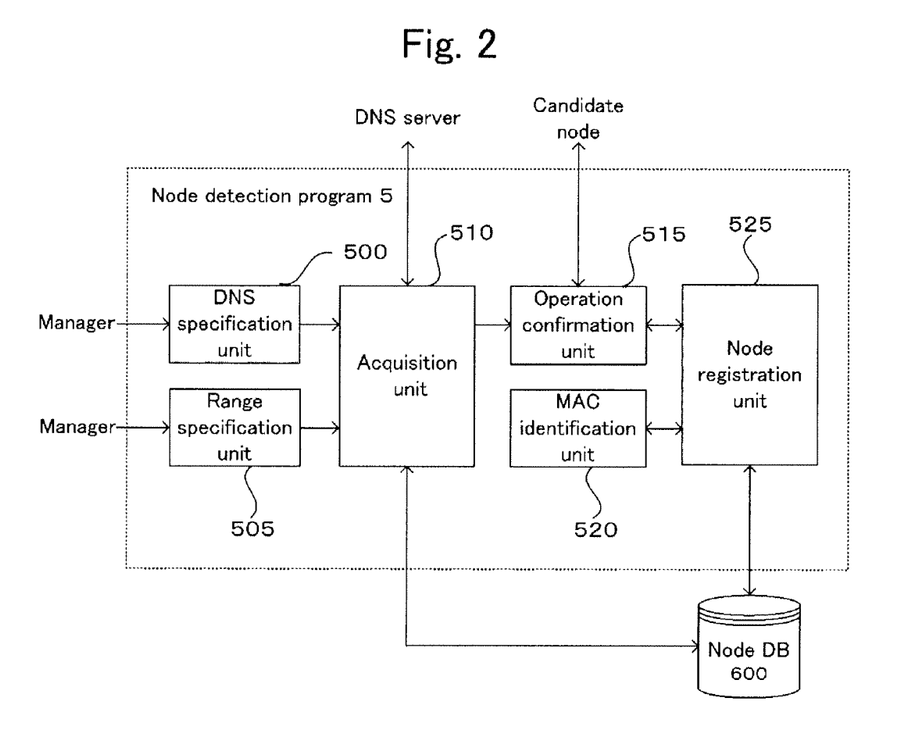
FIG. 2 is a diagram exemplifying a function configuration of a node detection apparatus 10.

FIG. 2 is a diagram exemplifying a function configuration of the node detection apparatus 10.

As exemplified in FIG. 2, the node detection apparatus 10 has a node detection program 5 and a node database 600 (node DB600).

The node detection program 5 is, for example, a computer program installed in the node detection apparatus 10 from a recording medium such as a CD-ROM. The node detection program 5 has a DNS specification unit 500, a range setting unit 505, an acquisition unit 510, an operation confirmation unit 515, an MAC identification unit 520, and a node registration unit 525.

The node DB600 is a database which manages identification information (specifically, host name, IP address, and MAC address (physical address)) of the nodes present in the network, and is composed of a recording region in the node detection apparatus 10. In the node DB600, information that denotes whether each node is an IPv6 node or an IPv4 node may be registered.

In the node detection program 5, the DNS specification unit 500 receives a specification from the DNS server in response to operations of a manager (user).

In response to the manager's operations, the range setting unit 505 sets a range of addresses which undergo node detection. For example, if one IP address is directly specified by the manager, the range setting unit 505 sets only the specified IP address as a range; if a segment (LAN etc.) is specified by the manager, it sets an IP address group corresponding to the specified segment; if a starting IP address and an ending IP address are specified by the manager, it sets a range from the starting IP address through the ending IP address; if a host name is specified by the manager, it sets an IP address corresponding to the specified host name; and if an IP address to be excluded is specified by the manager, it sets an IP address group from which the specified IP address is excluded.

The acquisition unit 510 acquires address information managed by the DNS server 8 and outputs the address information to the operation confirmation unit 515. For example, the acquisition unit 510 gains access to a DNS server 8 specified by the DNS specification unit 500 to acquire the AAAA records or the A records, extracts IP addresses and host names in a range specified by the range setting unit 505 from the acquired AAAA records or A records, and outputs the extracted IP addresses and host names as candidate nodes to the operation confirmation unit 515.

Based on the address information acquired by the acquisition unit 510, the operation confirmation unit 515 confirms operations of a node (communication equipment) which corresponds to this address information. For example, the operation confirmation unit 515 confirms operations of the node corresponding to the IP address input from the acquisition unit 510 according to an ICMP and outputs results of the confirmation to the node registration unit 525.

The MAC identification unit 520 identifies a media access control (MAC) address of a node to be registered by the node registration unit 525 and registers the identified MAC address in the node DB600 in condition where it is correlated with this node. For example, if the IP address of the node to be registered is of IPv6, the MAC identification unit 520 references a neighbor cache to identify an MAC address corresponding to the IP address of this node, and if the IP address of the node to be registered is of IPv4, it references an address resolution protocol (ARP) table to identify the MAC address corresponding to this IP address.

The node registration unit 525 registers information (address information, host name, etc.) about a node whose operations are confirmed by the operation confirmation unit 515, in the node DB600. For example, the node registration unit 525 registers an IP address, an MAC address, and a host name of a node whose operations are confirmed by the operation confirmation unit 515 and the version (IPv4 or IPv6) of this IP address, in the node DB600.

Figure 3:
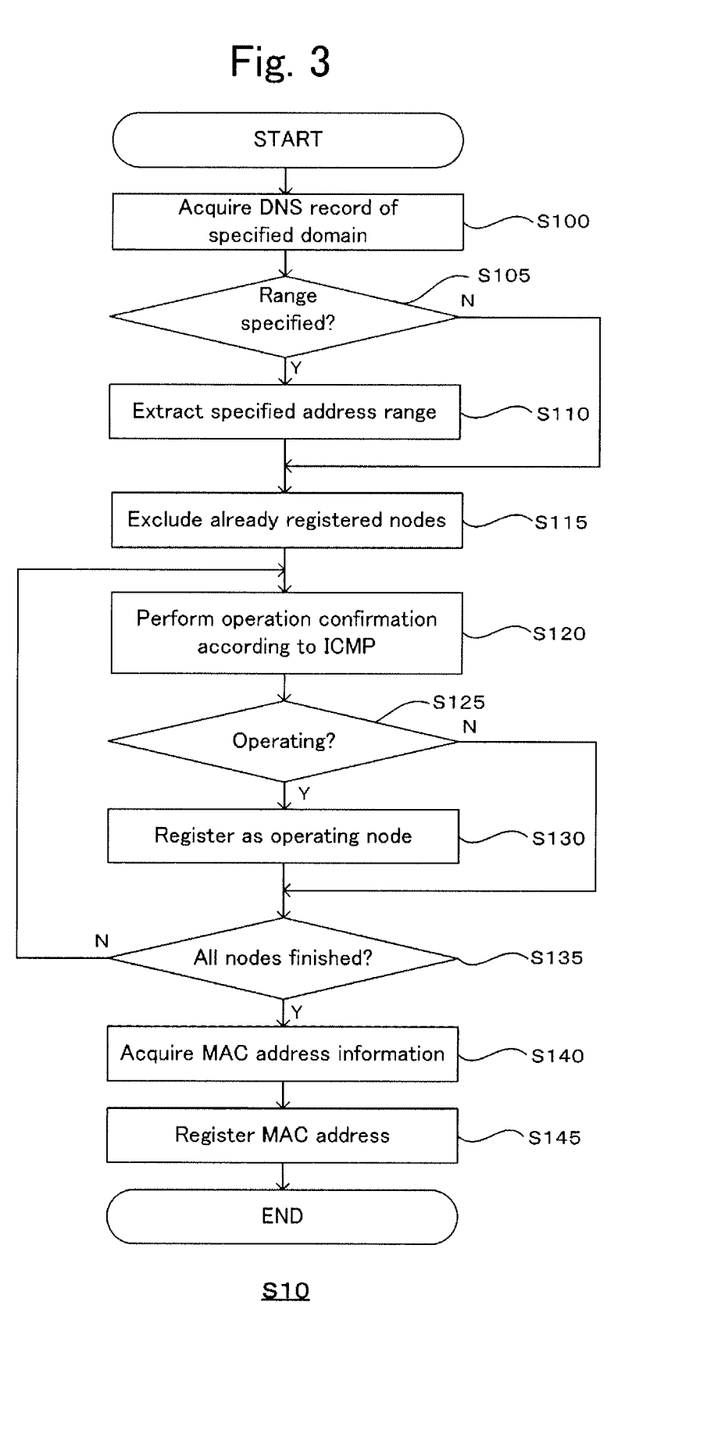
FIG. 3 is an explanatory flowchart of operations of the node detection apparatus 10.

FIG. 3 is an explanatory flowchart of operations of the node detection apparatus 10.

Figure 4A:
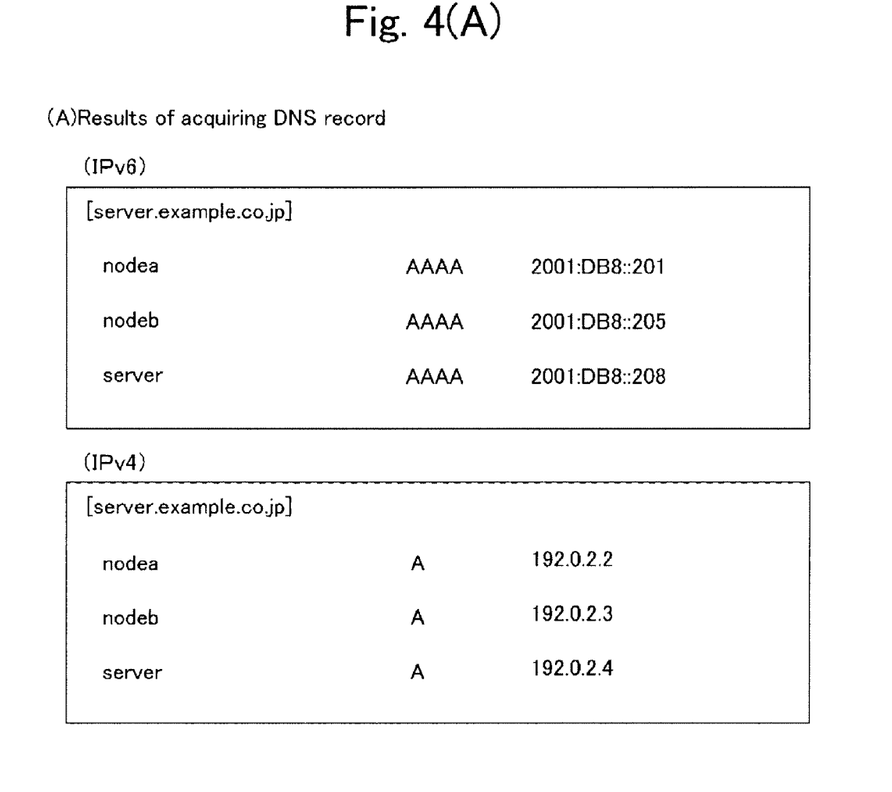
FIGS. 4(A), 4(B), and 4(C) are diagrams exemplifying information which is referenced by the node detection apparatus 10.
Figure 4B:
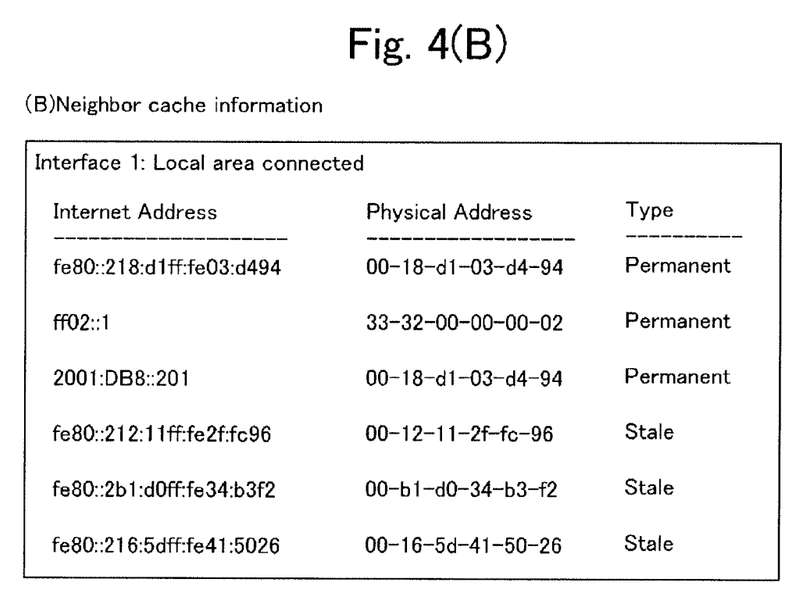
Figure 4C:
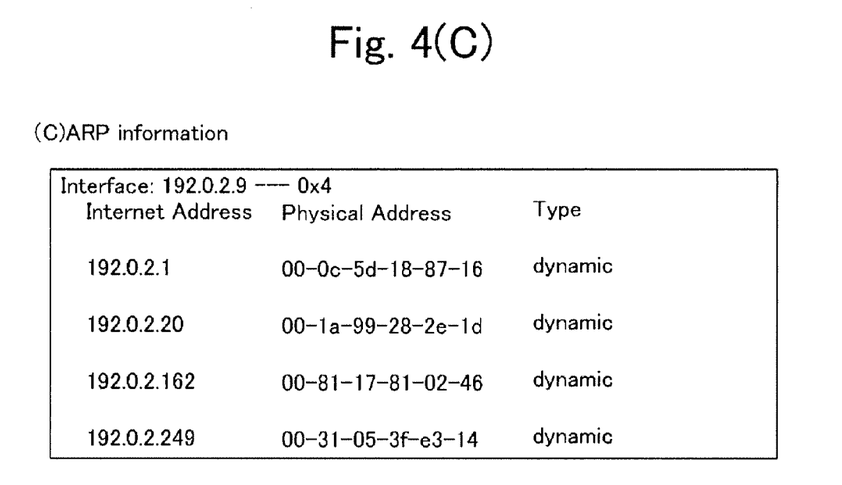

FIG. 4 is a diagram exemplifying information which is referenced by the node detection apparatus 10.

As exemplified in FIG. 3, in step 100 (S100), the DNS specification unit 500 in the node detection apparatus 10 displays a list of domain names by making an inquiry to the DNS server 8, to prompt the manager to specify a domain name.

If the manager selects any one of the domain names, the DNS specification unit 500 requests the AAAA records and the A records of the selected domain from the DNS server 8, thereby acquiring IP addresses and host names. Specifically, the acquisition unit 510 executes an nslookup command in which the record type is specified, for the DNS server 8. Accordingly, DNS records exemplified in FIG. 4(A) is acquired by the acquisition unit 510. The DNS records could contain IPv6 AAAA records and IPv4 A records.

In step 105 (S105), the node detection program 5 decides whether an IP address range is set by the range setting unit 505, and makes the shift to processing in S110 if the range is set and to processing in S115 if it is not set.

In step 110 (S110), the acquisition unit 510 extracts the IP addresses contained in the set range and the corresponding host names from among the acquired IP addresses and host names.

In step 115 (S115), the acquisition unit 510 excludes the IP addresses and host names registered in the node DB600 from the extracted IP addresses and host names and outputs the remaining IP addresses and host names to the operation confirmation unit 515.

In step 120 (S120), the operation confirmation unit 515 sequentially performs operation confirmation based on the IP addresses and host names input from the acquisition unit 510. Specifically, the operation confirmation unit 515 transmits ICMPv4 or ICMPv6 ECHOREQUEST to nodes having the input IP addresses.

In step 125 (S125), if operations of any one of the nodes are confirmed by the operation confirmation unit 515, the node detection program 5 decides that this node is present, and makes the shift to processing in step S130; and if the operations are not confirmed, the node detection program 5 decides that this node is not present, and makes the shift to processing in S135. Specifically, the operation confirmation unit 515 sequentially performs operation confirmation based on the IP addresses and host names input from the acquisition unit 510. More specifically, if ECHOREPLY is sent back corresponding to the transmitted ECHOREQUEST, the operation confirmation unit 515 notifies the node registration unit 525 of this node as an operating node; and if the ECHOREPLY is not sent back, the operation confirmation unit 515 decides that this node is not present.

In step 130 (S130), the node registration unit 525 registers, in the node DB600, the IP address and the host name of the node posted from the operation confirmation unit 515 as the operating node.

In step 135 (S135), the node detection program 5 decides whether operation confirmation is performed on all of the nodes extracted by the acquisition unit 510. If any of the nodes remain unconfirmed, the node detection program 5 returns to processing in S120 to perform operation confirmation on the next node until all of the nodes are confirmed, whereupon it makes the shift to processing in S140.

In step 140 (S140), the MAC identification unit 520 identifies an MAC address which corresponds to the IP address registered in the node DB600. Specifically, if the registered IP address is of IPv6, the MAC identification unit 520 searches neighbor cache information exemplified in FIG. 4(B) for an MAC address which corresponds to the same IP address as the registered IP address. If the registered IP address is of IPv4, the MAC identification unit 520 searches an ARP table exemplified in FIG. 4(C) for an MAC address (physical address) which corresponds to the same IP address as the registered IP address.

In step 145 (S145), the MAC identification unit 520 registers the identified MAC address in the node DB600 in condition where it is correlated with the registered IP address. The MAC identification unit 520 of the present example registers the MAC address in the node DB600 via the node registration unit 525.

Figure 5:
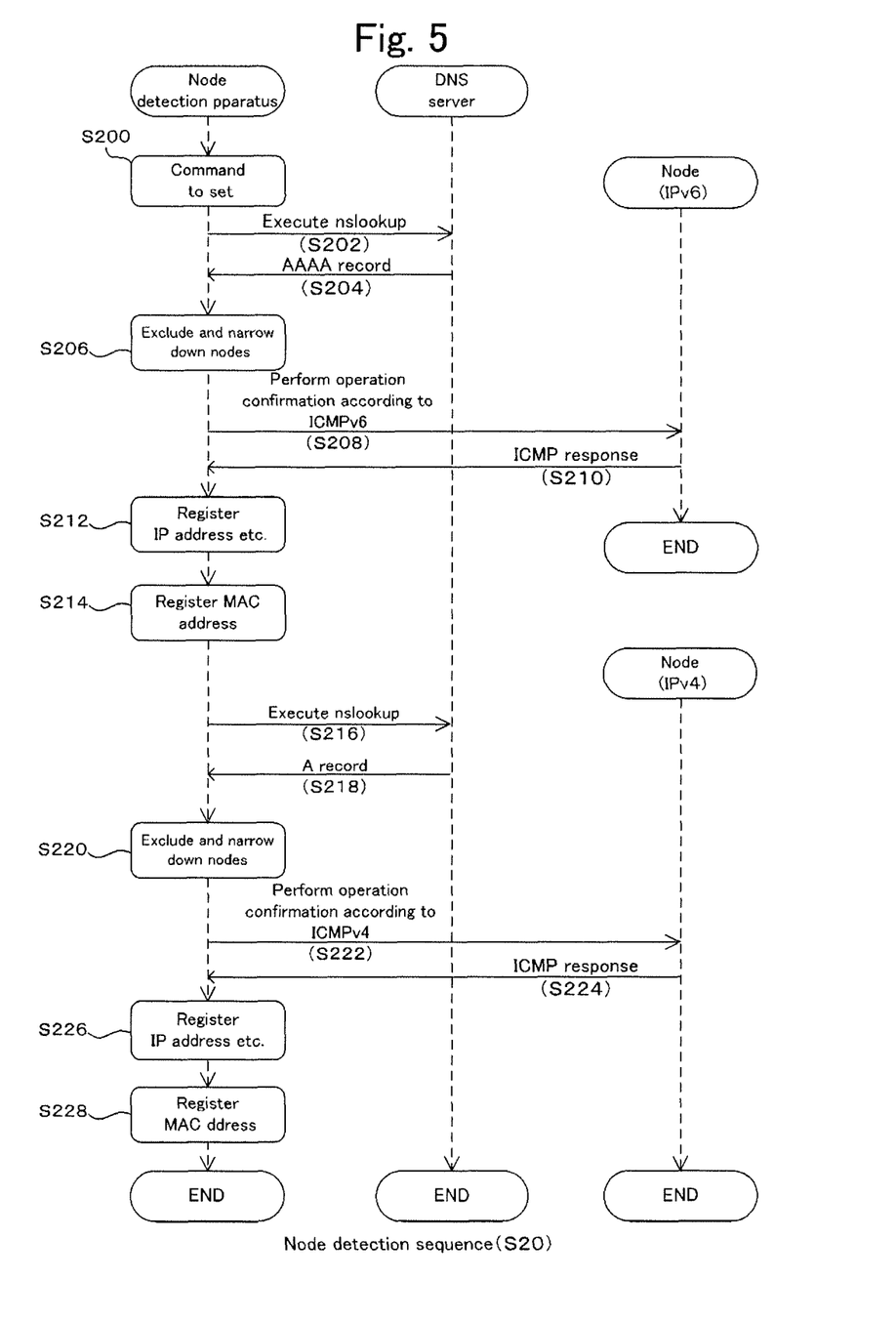
FIG. 5 is an explanatory sequence diagram of overall operations of node detection processing.

FIG. 5 is an explanatory sequence diagram of the overall operations of node detection processing.

As shown in FIG. 5, if the manager (user) commands the node detection apparatus 10 to start node detection by specifying a DNS server and setting an address range (S200), the node detection apparatus 10 executes the nslookup command in which the AAAA record is specified on the DNS server specified by the manager (S202).

In response to a request from the node detection apparatus 10, the DNS server 8 sends back the AAAA records (S204).

The node detection apparatus 10 extracts IP addresses and host names contained in the set address range from the returned AAAA records and excludes the IP addresses and host names registered in the node DB600 from those extracted IP addresses and host names, thereby giving the remaining IP addresses and host names as candidate nodes (S206).

The node detection apparatus 10 transmits ICMPv6 ECHOREQUEST by using the candidate node's IP address (S208).

When having received ECHOREQUEST, the node 902 sends back ECHOREPLY to the node detection apparatus 10 (S210).

When having received ECHOREPLY from the node 902, the node detection apparatus 10 establishes the IP address and the host name of this node 902 as operating nodes and registers them in the node DB600 (S212).

Figure 6A:
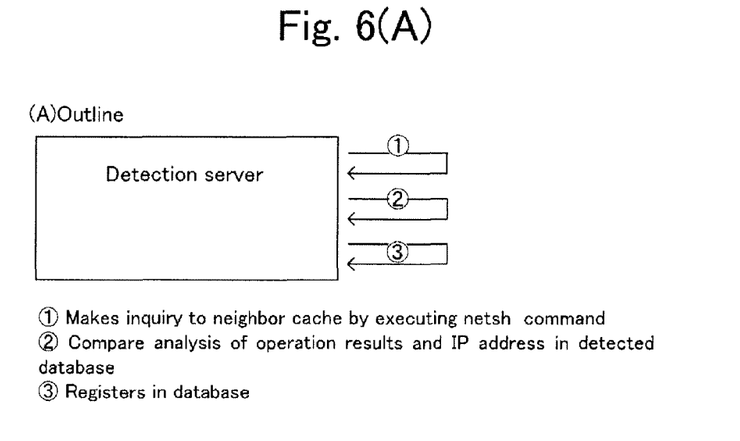
FIGS. 6(A), 6(B), and 6(C) are explanatory diagrams of a method of identifying an MAC address of an IPv6 environment.
Figure 6B:
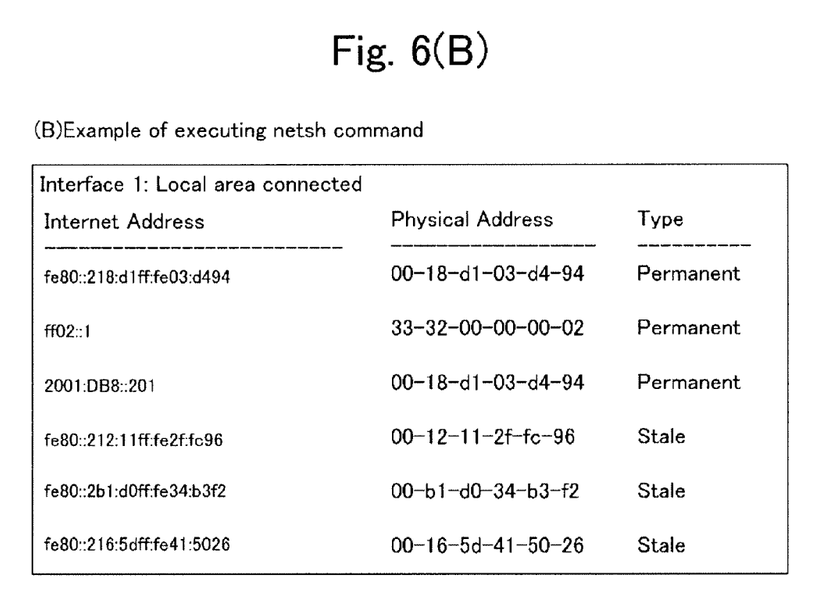
Figure 6C:
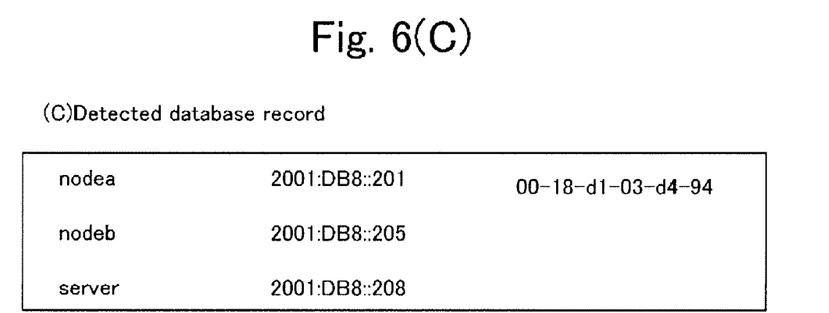

As exemplified in FIG. 6, the node detection apparatus 10 makes an inquiry to a neighbor cache by executing a netsh command to search the information of the neighbor cache for an MAC address which corresponds to the IP address registered in the node DB600 and registers a found MAC address in the node DB600 (detected database records) in condition where it is correlated with the registered IP address (S214).

Next, the node detection apparatus executes the nslookup command in which the A record is specified on the DNS server specified by the manager (S216).

In response to a request from the node detection apparatus 10, the DNS server 8 sends back the A records (S218).

The node detection apparatus 10 extracts IP addresses and host names contained in the set address range from the returned A records and excludes the IP addresses and host names registered in the node DB600 from those extracted IP addresses and host names, thereby giving the remaining IP addresses and host names as candidate nodes (S220).

The node detection apparatus 10 transmits ICMP ECHOREQUEST by using the candidate node's IP address (S222).

When having received ECHOREQUEST, the node 902 sends back ECHOREPLY to the node detection apparatus 10 (S224).

When having received ECHOREPLY from the node 902, the node detection apparatus 10 establishes the IP address and the host name of this node 902 as operating nodes and registers them in the node DB600 (S226).

The node detection apparatus 10 makes an inquiry to the ARP table to search the ARP table exemplified in FIG. 4(C) for an MAC address which corresponds to the IP address registered in the node DB600 and registers a found MAC address in the node DB in condition where it is correlated with the registered IP address (S228).

As described hereinabove, the node detection apparatus 10 of the present embodiment collects nodes registered in the DNS server 8 as candidate nodes and confirms operations of the candidate nodes to establish nodes present in a network. In such a manner, a lot of nodes present in the network can be detected easily. This method is well suited for use, in particular, in a large scale network including a plurality of subnetworks.

Further, by covering both of the AAAA records and the A records, the node detection apparatus 10 can detect nodes both in the IPv4 environment and the IPv6 environment. Furthermore, in the IPv6 environment or an environment in which IPv4 and IPv6 are mixed, an address space becomes huge; therefore, in comparison to the case of detecting nodes in the IP address round-robin processing, the node detection processing is speedy and network loads are reduced.

Moreover, the node detection apparatus 10 sets an address range and excludes already registered nodes to narrow down the nodes which undergo ICMP operation confirmation, thereby realizing speedy processing and reduced network loads.

[Modifications]

A description will be given of modifications of the above embodiment.

Although in the above embodiment, after the acquisition unit 510 has acquired a DNS record, only the nodes in a set address range have been listed, the present invention is not limited to it; for example, the acquisition unit 510 may acquire only the DNS records covered in an address range set by the range setting unit 505.

Alternatively, for example, when DNS servers display a list of domain names managed by the DNS server, the DNS specification unit 500 may prompt the manager to specify any one of the DNS servers. It is thus possible to cover a wide range of domains.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A node detection apparatus comprising:
   an acquisition section that acquires address information of communication equipment managed by a DNS server from the DNS server;
   an operation confirmation section that confirms operations of the communication equipment based on the address information acquired by the acquisition section; and
   a node registration section that registers the communication equipment having the address information acquired by the acquisition section as an operating node, based on a result of the operation confirmation by the operation confirmation section, wherein the operation confirmation section determines, if operations of any one of the communication equipment is not confirmed whether this communication equipment is not present.

2. The node detection apparatus according to claim 1, wherein: the acquisition section acquires an AAAA record and an A record which are managed by the DNS server;
   the operation confirmation section confirms operations of the communication equipment by using IP addresses contained in the acquired AAAA record and A record; and
   the node registration section registers a host name corresponding to the IP address whose operations are confirmed, as an operating node.

3. The node detection apparatus according to claim 2, wherein the operation confirmation section performs the operation confirmation on the IP address contained in the AAAA record according to ICMPv6 and performs the operation confirmation on the IP address contained in the A record according to ICMPv4.

4. The node detection apparatus according to claim 1, wherein the node registration section registers the host name whose operations are confirmed in condition where it is correlated with IPv6 or IPv4 based on whether the IP address is contained in the AAAA record or in the A record.

5. The node detection apparatus according to claim 1, further comprising a range setting section that sets a range of the IP addresses which undergo node detection,
   wherein the acquisition section acquires the AAAA record or the A record that corresponds to the IP address range which is set by the range setting section.

6. The node detection apparatus according to claim 1, wherein the acquisition section acquires the AAAA record or the A record from the DNS server specified by a user.

7. The node detection apparatus according to claim 1, wherein the operation confirmation section performs the operation confirmation only on the IP addresses not registered as the operating node by the node registration section among the IP addresses contained in the AAAA record or the A record.

8. The node detection apparatus according to claim 1, further comprising an MAC identification section that identifies an MAC address which corresponds to the IP address of the communication equipment whose operations are confirmed, based on a neighbor cache or an ARP table,
   wherein the node registration section registers the IP address of the communication equipment whose operations are confirmed and the MAC address acquired by the MAC identification section.

9. A node detection method comprising the steps of:
   acquiring address information of communication equipment managed by a DNS server from the DNS server;
   confirming operations of the communication equipment based on the acquired address information; and
   registering the communication equipment having the acquired address information as an operating node, based on a result of the operation confirmation;
   wherein the operation confirmation determines, if operations of any one of the communication equipment is not confirmed whether this communication equipment is not present.

10. A non-transitory computer-readable medium storing thereon a computer program that causes a computer to perform the steps of:
   acquiring address information of communication equipment managed by a DNS server from the DNS server;
   confirming operations of the communication equipment based on the acquired address information; and
   registering the communication equipment having the acquired address information as an operating node, based on a result of the operation confirmation
   wherein the operation confirmation determines, if operations of any one of the communication equipment is not confirmed whether this communication equipment is not present.

* * * * *